(12) United States Patent
Penna et al.

(10) Patent No.: US 6,990,746 B2
(45) Date of Patent: Jan. 31, 2006

(54) SLIDE CALIPERS

(76) Inventors: Christopher Paul Penna, 77 Colony St., Hamden, CT (US) 06518; Dale Allan Watson, 688 Trout Brook Dr., West Hartford, CT (US) 06119-2224

( * ) Notice: Subject to any disclaimer, the term of this patent is extended or adjusted under 35 U.S.C. 154(b) by 0 days.

(21) Appl. No.: 10/832,696

(22) Filed: Apr. 27, 2004

(65) Prior Publication Data

US 2005/0235516 A1 Oct. 27, 2005

(51) Int. Cl.
*G01B 3/20* (2006.01)
(52) U.S. Cl. ............................. 33/784; 33/783
(58) Field of Classification Search ............. 33/784, 33/783, 791, 792, 793, 794, 795, 797, 806, 33/807
See application file for complete search history.

(56) References Cited

U.S. PATENT DOCUMENTS

| | | | |
|---|---|---|---|
| 114,378 A | 5/1871 | Wilson | |
| 160,503 A | 3/1875 | Ascough | |
| 708,376 A | 9/1902 | Lundgren | |
| 735,935 A | 8/1903 | Billings | |
| 761,378 A | 5/1904 | Hazelton | |
| 764,937 A | 7/1904 | Friedman | |
| 1,039,901 A | 10/1912 | Constantinescu | |
| 1,253,096 A | 1/1918 | Preston | |
| 1,343,227 A | 6/1920 | Ostdiek | |
| 2,812,582 A | 11/1957 | Achbach | |
| 4,586,260 A | 5/1986 | Baxter et al. | |
| 4,612,656 A * | 9/1986 | Suzuki et al. | 33/784 |
| 5,056,238 A | 10/1991 | Chi | |
| 5,490,335 A | 2/1996 | Chu | |
| 6,279,248 B1 * | 8/2001 | Walters | 33/784 |
| 6,834,439 B2 * | 12/2004 | Matsumiya et al. | 33/706 |

FOREIGN PATENT DOCUMENTS

SU 1404787 A1 6/1988

* cited by examiner

*Primary Examiner*—Christopher W. Fulton
(74) *Attorney, Agent, or Firm*—McCormick, Paulding & Huber LLP

(57) ABSTRACT

A slide caliper includes an elongated shaft defining a gaging surface for abutting against a first surface of an object to be measured. A first jaw is coupled to the shaft and defines a gaging surface for abutting against a second surface of the object. A second jaw is slidably coupled to the shaft and defines a gaging surface for abutting against a third surface or edge of the object. The second jaw along the shaft is adjustable between a first position where the gaging surfaces of the jaws generally abut each other to a second position where the gaging surfaces of the jaws are maximally spaced from each other. At least one of the jaws is adjustably pivotable relative to the shaft about a pivot axis coinciding with an intersection of the gaging surface of the shaft and another axis extending along the associated gaging surface of the pivotable jaw.

35 Claims, 13 Drawing Sheets

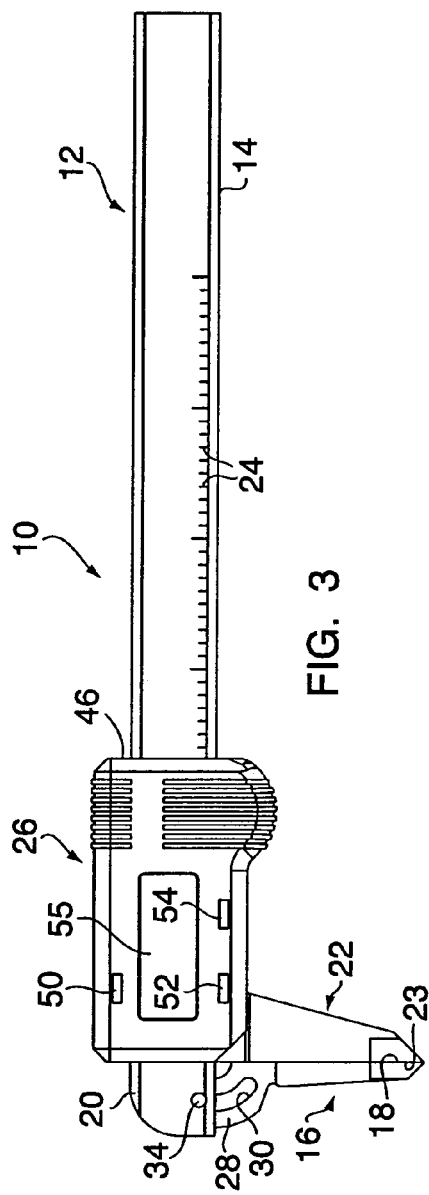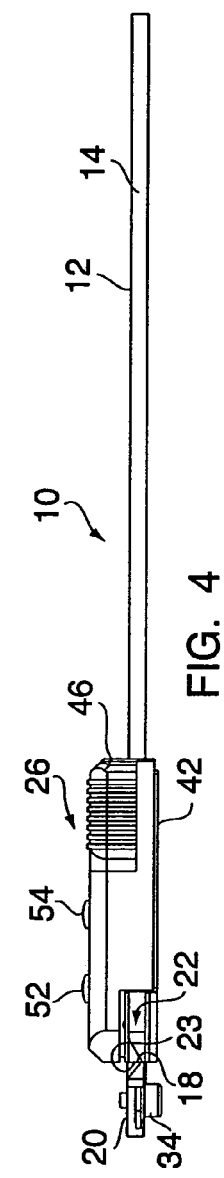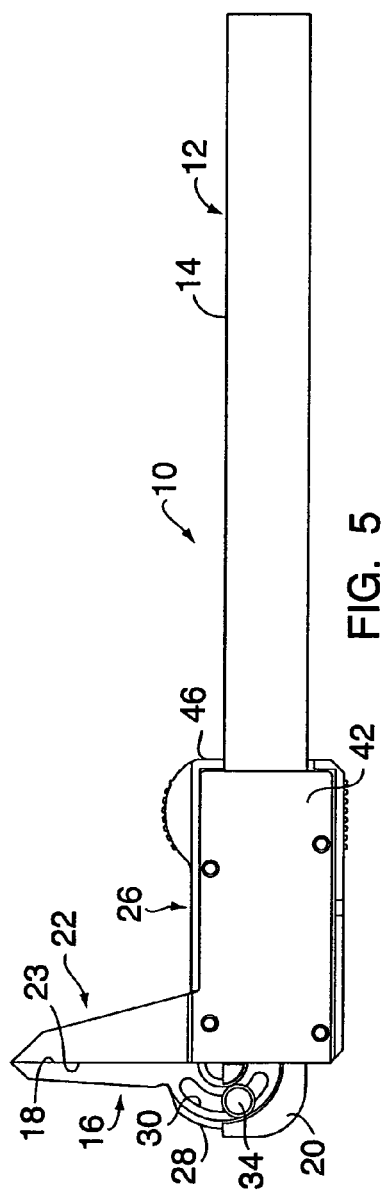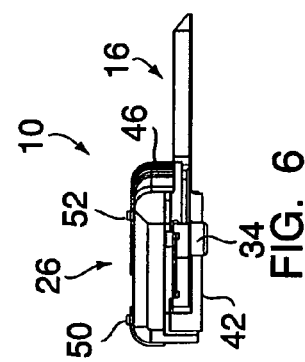

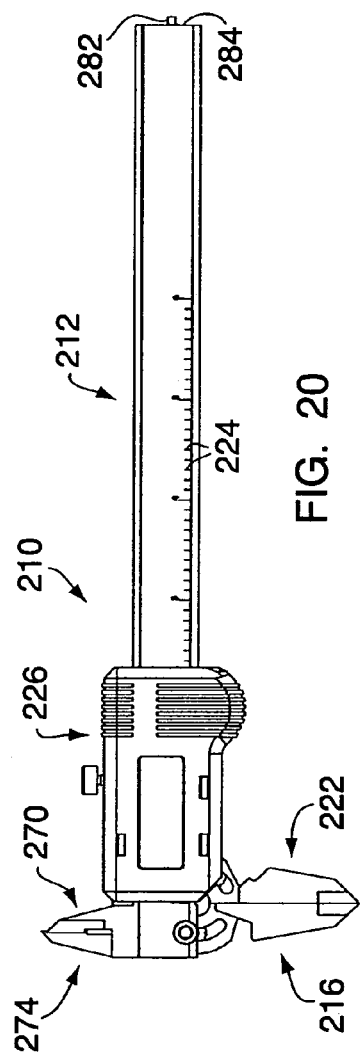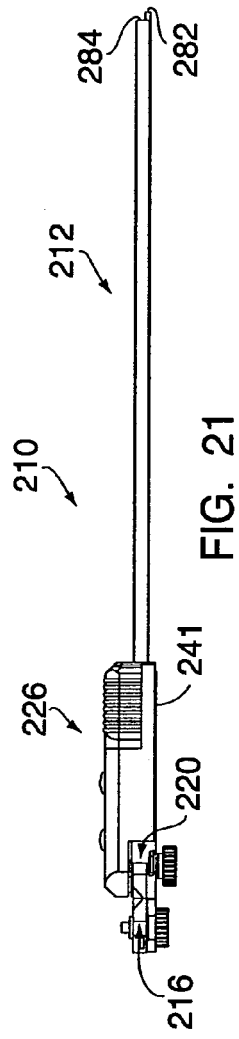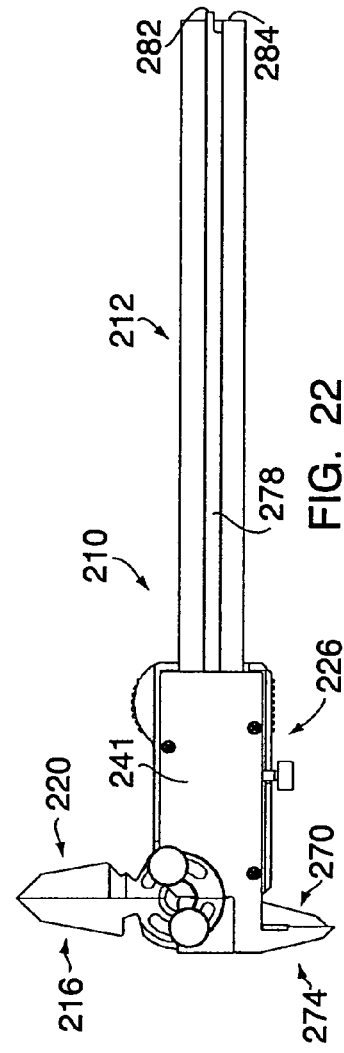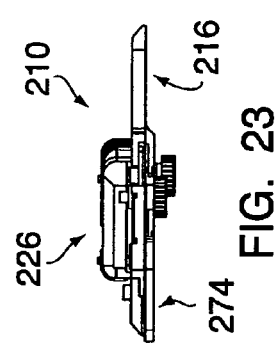

US 6,990,746 B2

SLIDE CALIPERS

FIELD OF THE INVENTION

This invention relates generally to calipers, and more particularly to slide calipers for accurately measuring the length of structures between one or more theoretical sharp corners.

BACKGROUND OF THE INVENTION

One of the possible services in the fan and blower industry is to design and manufacture custom fan tray systems. The manufacturing of custom fan tray systems involves sheet metal manufacturing and assembly work. The dimensions to rounded edges (bends) of sheet metal parts are given to the theoretical sharp corners. The location of the theoretical sharp corner is also referred to as mold lines or apexes, and is defined as the location in space where two walls would intersect if they joined at a sharp corner rather than at a rounded edge. Despite the sophisticated equipment available for the manufacture of custom fan trays, there is no adequate handheld tool to measure the lengths of sheet metal walls that are not bent at a right angle. The lengths are most commonly measured to the corner where two walls meet. The corner of two walls that do not meet at right angles is commonly referred to as a "theoretical sharp corner". Typically during first article inspections the measurement of these walls are skipped since there is no method to easily measure walls with theoretical sharp corners.

When a sheet metal design having a theoretical sharp corner is given to a brake press operator for a forming operation, the operator either estimates the length of the wall, or a "custom go/no go" gage is built to check the length. Such gages do not specifically measure values; rather, they merely indicate to the operator whether the part is acceptable. Custom gages have to be designed and built for each application, and can be quite expensive. Moreover, such gages are only useful for one application.

In order to solve this measurement problem it has been envisioned to use combination squares to indirectly measure the length of walls with theoretical sharp corners. However, indirect measurement using a combination square can be slow and cumbersome, can rely heavily on operator technique, and can be very inaccurate. It has also been envisioned to use more sophisticated measuring equipment for measuring theoretical sharp corners such as coordinate measuring machines, video capture systems, and optical comparators. However, these are complex, specialized equipment and tend to be quite expensive as compared to a hand held device such as, for example, slide calipers. Such equipment would tend to be maintained in a fixed location such as a quality lab, and therefore those wanting to use the equipment on a shop floor or in design engineering offices would not have timely access to such equipment. Moreover, the sophisticated metrology equipment would require specialized training and dedicated operators.

Accordingly, it is an object of the present invention to provide a simple, hand-held and inexpensive apparatus for accurately measuring the length of structures between one or more theoretical sharp corners that overcomes the above-mentioned drawbacks and disadvantages.

SUMMARY OF THE INVENTION

In a first aspect of the present invention, a slide caliper comprises an elongated shaft defining a gaging surface for abutting against a first surface of an object having a length to be measured. A first jaw is coupled to the shaft and defines a gaging surface for abutting against a second surface of the object. A second jaw is slidably coupled to the shaft and defines a gaging surface for abutting against a third surface of the object. The second jaw is adjustable in position along the shaft between a first position where the gaging surfaces of the jaws generally abut each other to a predetermined second position where the gaging surfaces of the jaws are generally maximally spaced from each other. One of the jaws is adjustably pivotable relative to the shaft about a pivot axis coinciding with an intersection of the gaging surface of the shaft and another axis extending along the associated gaging surface of the adjustably pivotable jaw.

In a second aspect of the present invention, a slide caliper comprises an elongated shaft defining a gaging surface for abutting against a first surface of an object having a length to be measured. A first jaw is coupled to the shaft and defines a gaging surface for abutting against a second surface of the object. The first jaw is adjustably pivotable relative to the shaft about a pivot axis coinciding with an intersection of the gaging surface of the shaft and another axis extending along the gaging surface of the first jaw. A second jaw is slidably coupled to the shaft and defines a gaging surface for abutting against a third surface of the object. The second jaw is adjustable in position along the shaft between a first position where the gaging surfaces of the jaws generally abut each other to a predetermined second position where the gaging surfaces of the jaws are generally maximally spaced from each other. The gaging surface of the second jaw is generally perpendicular to the gaging surface of the shaft.

In a third aspect of the present invention, a slide caliper comprises an elongated shaft defining a gaging surface for abutting against a first surface of an object having a length to be measured. A first jaw is coupled to the shaft and defines a gaging surface for abutting against a second surface of the object. The first jaw is adjustably pivotable relative to the shaft about a pivot axis coinciding with an intersection of the gaging surface of the shaft and another axis extending along the gaging surface of the first jaw. A second jaw is slidably coupled to the shaft and defines a gaging surface for abutting against a third surface of the object. The second jaw is adjustable in position along the shaft between a first position where the gaging surfaces of the jaws generally abut each other to a predetermined second position where the gaging surfaces of the jaws are generally maximally spaced from each other. The second jaw is adjustably pivotable relative to the shaft about a pivot axis coinciding with an intersection of the gaging surface of the shaft and another axis extending along the gaging surface of the second jaw.

BRIEF DESCRIPTION OF THE DRAWINGS

FIG. 3 is a top plan view of the slide caliper of FIG. 1.

FIG. 4 is a side elevation view of the slide caliper of FIG. 1.

FIG. 5 is a bottom plan view of the slide caliper of FIG. 1.

FIG. 6 is an end view of the slide caliper of FIG. 1.

FIG. 20 is a top plan view of the slide caliper of FIG. 18.

FIG. 21 is a side elevation view of the slide caliper of FIG. 18.

FIG. 22 is a bottom plan view of the slide caliper of FIG. 18.

FIG. 23 is an end view of the slide caliper of FIG. 18.

DETAILED DESCRIPTION OF THE PREFERRED EMBODIMENTS

Figure 1:
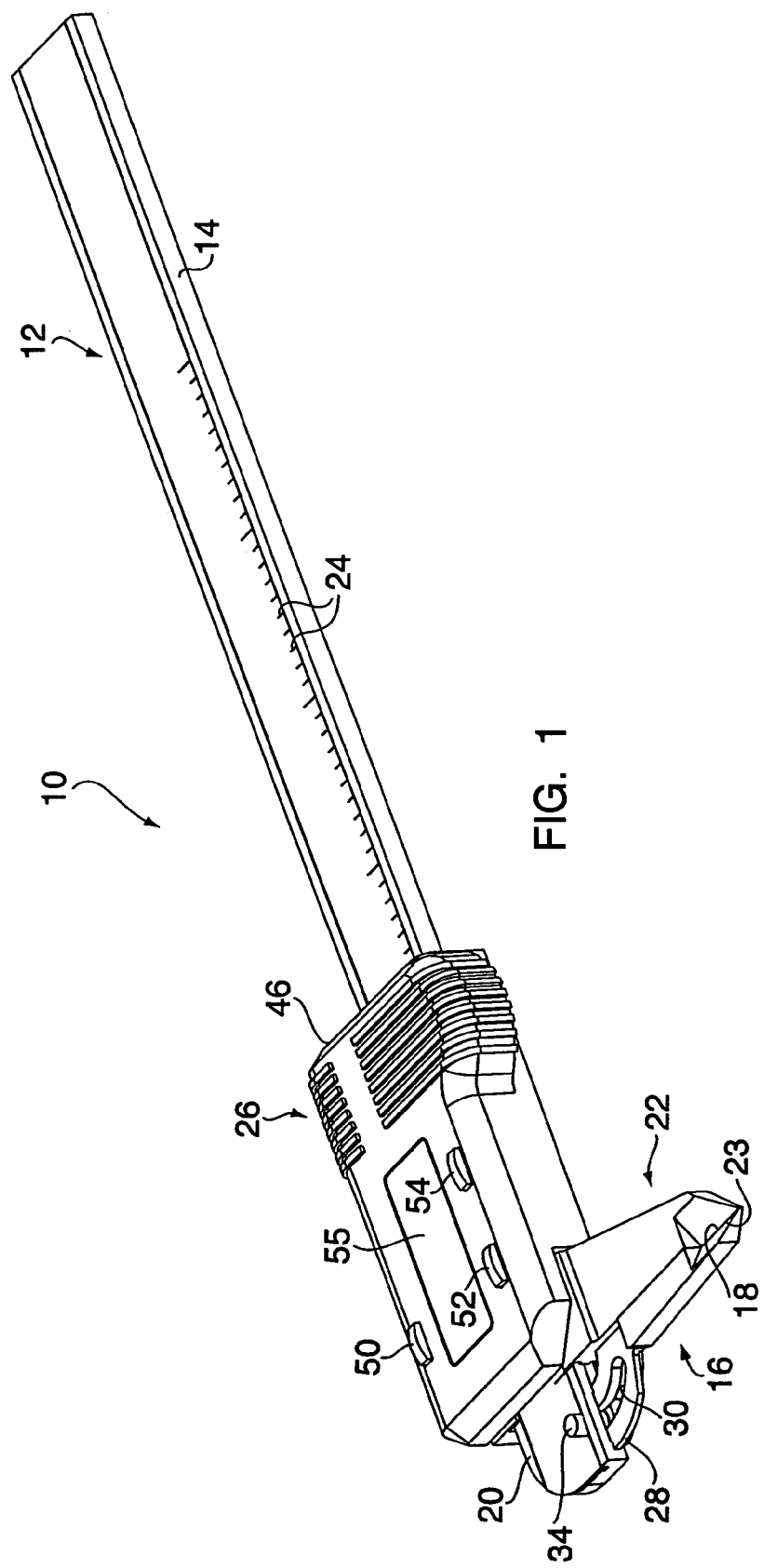
FIG. 1 is an isometric view of a slide caliper embodying the present invention.

With reference to FIGS. 1–10, a slide caliper embodying the present invention is generally indicated by the reference number 10. The slide caliper 10 is used for measuring the length between two corners of an object wherein one corner might form a theoretical sharp corner (i.e., a non-right angle).

The slide caliper 10 comprises an elongated shaft 12 defining a first gaging surface 14. A first jaw 16 defining a second gaging surface 18 is pivotally coupled to the shaft 12, preferably adjacent to a first longitudinal end 20 of the shaft. A second jaw 22 defining a third gaging surface 23 is slidably coupled to the shaft 12 for movement therealong. The shaft 12 preferably includes a graduated or linear measuring scale 24 therealong for measuring the distance between two corners of an object to be held between the gaging surface 18 of the first jaw 16 and the gaging surface 23 of the second jaw 22 as will be explained more fully below. The shaft 12 also preferably includes a conventional digital measuring device 26 coupled to and slidable with the second jaw 22 along the shaft for more precisely measuring the distance between two corners of the object to be held between the first and second jaws 16, 22.

Figure 2:
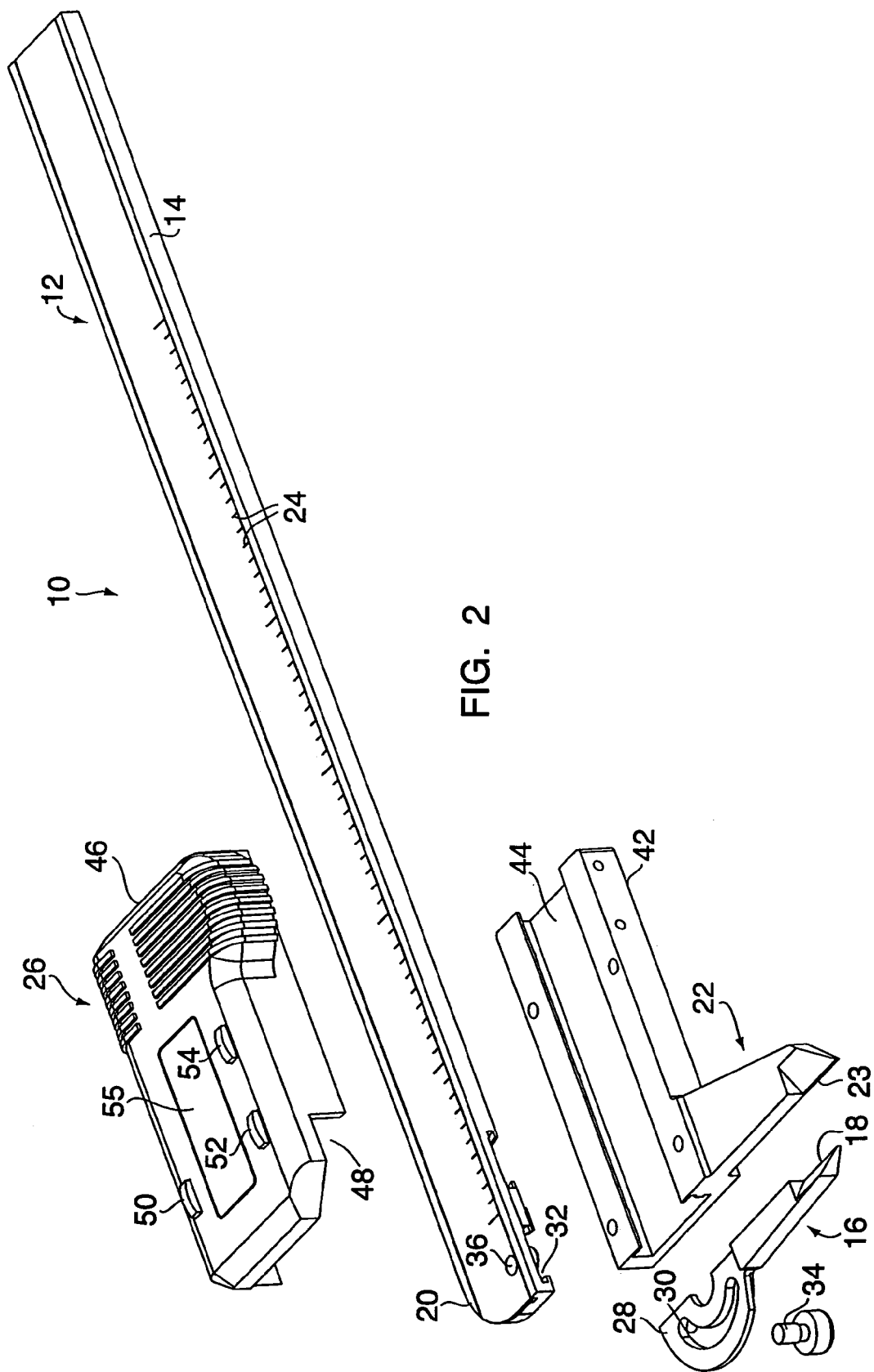
FIG. 2 is an exploded isometric view of the slide caliper of FIG. 1.

As best shown in FIG. 2, the first jaw 16 includes an arcuate extension 28 defining a semi-circular slot 30 for being pivotally received within a recess 32 defined by an underside of the shaft 12. The arcuate extension 28 of the first jaw 16 when received within the recess 32 is coupled to and tightened against the shaft 12 with, for example, a thumb screw 34 having two components cooperating with each other to extend through an aperture 36 defined by the shaft and the slot 30 defined by the arcuate extension of the first jaw.

Figure 7:
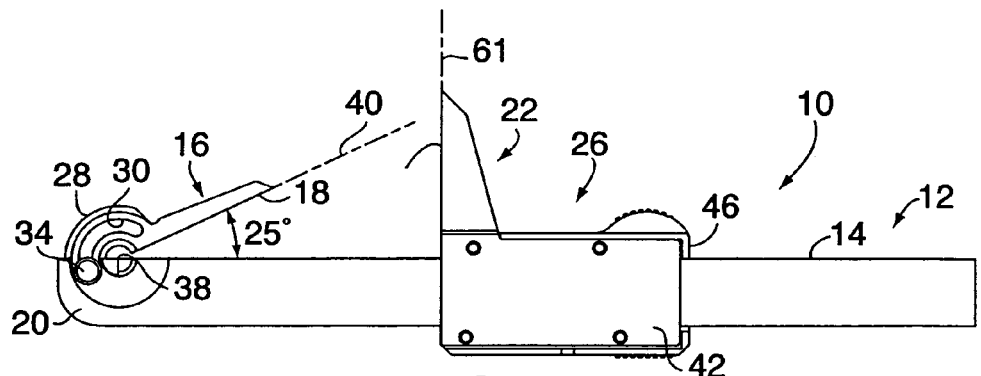
FIG. 7 is a bottom plan view of the slide caliper of FIG. 1 showing a pivot jaw in a first orientation relative to the shaft of the slide caliper.
Figure 8:
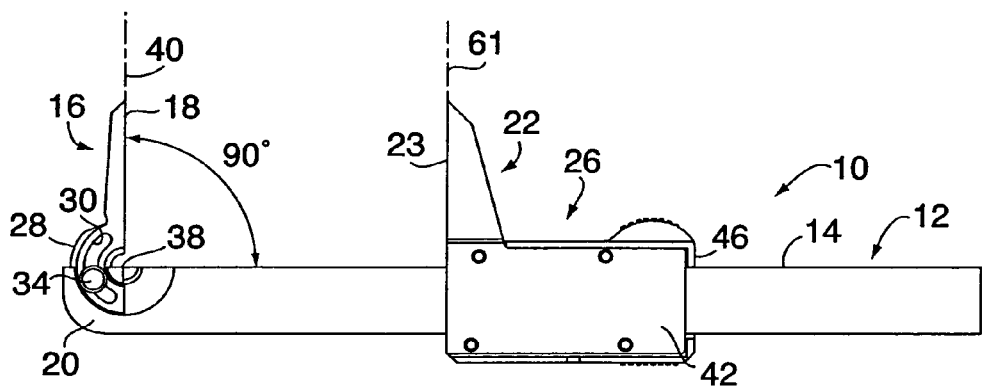
FIG. 8 is a bottom plan view of the slide caliper of FIG. 1 showing a pivot jaw in a second orientation relative to the shaft of the slide caliper.
Figure 9:
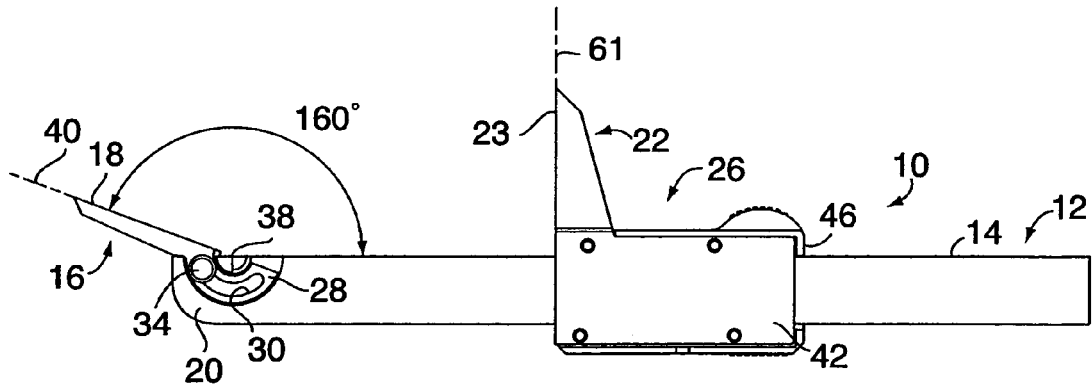
FIG. 9 is a bottom plan view of the slide caliper of FIG. 1 showing a pivot jaw in a third orientation relative to the shaft of the slide caliper.

As shown in FIGS. 7–9, the first jaw 16 is generally continuously adjustably pivotable relative to the shaft 12 about a pivot axis 38 coinciding with an intersection of the gaging surface 14 of the shaft 12 and another axis 40 extending along the gaging surface 18 of the first jaw. Preferably, the pivot axis 38 is a zero distance mark of a measuring scale for generally measuring the distance between two corners of an object to be held between the gaging surface 18 of the first jaw 16 and the gaging surface 23 of the second jaw 22. More precisely, the slide caliper 10 measures the distance along the shaft 12 between the intersection of the gaging surface 14 of the shaft 12 and the axis 40 extending along the gaging surface 18 of the first jaw 16, and the intersection of the gaging surface 14 of the shaft 12 and an axis 61 extending along the gaging surface 23 of the second jaw 22.

The first jaw 16 is adjustably pivotable to enable the gaging surface 18 of the first jaw to abut and thereby accommodate an adjacent wall of an object having a corner forming various angles including a right angle and angles that are less than or greater than 90 degrees. FIG. 7, for example, shows the first jaw 16 oriented such that the gaging surface 18 of the first jaw forms a 25 degree angle with the gaging surface 14 of the shaft 12. FIG. 8, for example, shows the first jaw 16 in a neutral orientation such that the gaging surface 18 of the first jaw forms a 90 degree angle with the gaging surface 14 of the shaft 12. FIG. 9, for example, shows the first jaw 16 oriented such that the gaging surface 18 of the first jaw forms a 160 degree angle with the gaging surface 14 of the shaft 12. Accordingly, the first jaw 16 is adjustably pivotable in either direction away from the neutral orientation of 90 degrees in order to accommodate objects having corners either less than 90 degrees or greater than 90 degrees. Moreover, as can be seen in FIG. 8 the ability of the first jaw 16 to assume a neutral orientation of 90 degrees permits the slide caliper 10 to be employed in a conventional manner.

As best shown in FIG. 2, the second jaw 22 includes an extension 42 defining a channel 44 for slidably receiving the underside of the shaft 12 to enable movement of the second jaw along the shaft between a first position where the gaging surfaces 18, 23 of the jaws 16, 22 generally abut each other to a predetermined second position where the gaging surfaces of the jaws are generally maximally spaced from each other. The second jaw 22 is non-pivotally coupled to the shaft 12 such that the gaging surface 23 of the second jaw is oriented perpendicularly to or at right angles with the gaging surface 14 of the shaft.

The digital measuring device 26 includes a housing 46 defining a recess 48 on an underside thereof for being received over the shaft 12 and engaging the extension 42 of the second jaw 22 to secure the second jaw to the shaft for movement therealong. The digital measuring device 26 preferably includes a display panel 55, first switch 50 for toggling between measurements in inches and millimeters, a second switch 52 for turning the device on or off, and a third switch 54 for calibrating the digital measuring device when the gaging surface 18 of the first jaw 16 abuts the gaging surface 23 of the second jaw 22 as shown, for example, in FIG. 1. Although the digital measuring device 26 is shown and described by way of example with three switches performing specific functions, it should be understood that the digital measuring device can be embodied in other ways without departing from the scope of the present invention. For example, the second switch 52 for turning the device on or off is not necessary for a solar powered digital measuring device.

In operation, the digital measuring device 26 of the slide caliper 10 is turned on by pressing the second switch 52. The digital measuring device 26 is preferably calibrated/zeroed by moving the second jaw 22 along the shaft 12 until the gaging surface 23 of the second jaw 22 abuts the gaging surface 18 of the first jaw 16. While the gaging surfaces 18, 23 of the first and second jaws 16, 22 are abutting each other, the third switch 54 is pressed to calibrate/zero the digital measuring device 26. The second jaw 22 is then moved along the shaft 12 away from the first jaw 16 in order to accommodate between the jaws an object to be measured such as, for example, a sheet metal wall of a fan tray.

Figure 10:
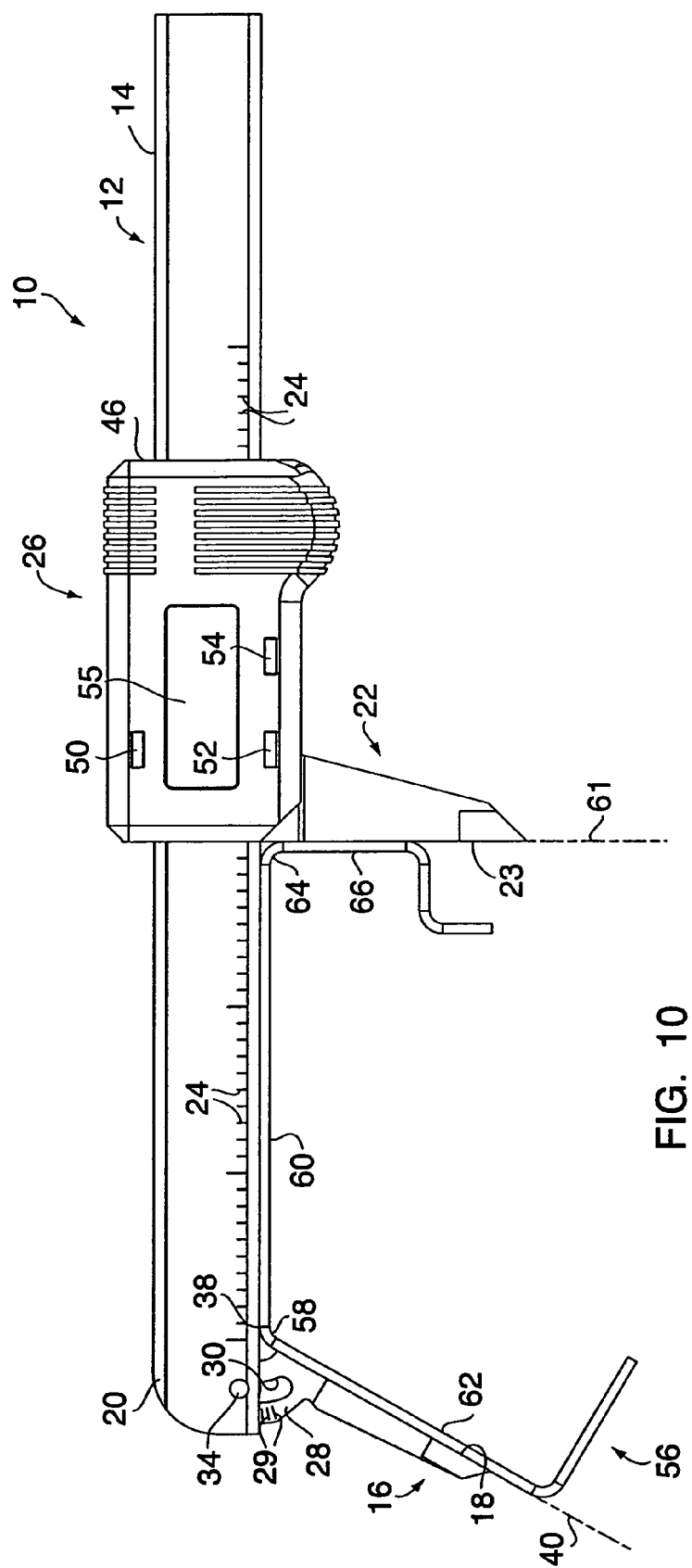
FIG. 10 is a top plan view showing the slide caliper of FIG. 1 measuring a structure having one theoretical sharp corner.

As shown by way of example in FIG. 10, a fan tray 56 includes a sheet metal wall having a distance to be measured between two corners of the tray. A first corner 58 of the tray 56 is defined as the convergence of a first wall 60 and a second wall 62 of the tray. A second corner 64 of the tray 56 is defined as the convergence of the first wall 60 and a third wall 66. As can be seen in FIG. 10, the first wall 60 and the second wall 62 converging at the first corner 58 cooperate to form a theoretical sharp corner having an angle that is greater than 90 degrees. The first wall 60 and the third wall 66 converging at the second corner 64 cooperate to form an angle of 90 degrees (i.e., right angle). However, it should be understood that the second corner 64 and the third wall 66 can be substituted by a plane edge of the first wall 60 in order to form the right angle.

The first wall 60 of the tray 56 is placed against the gaging surface 14 of the shaft 12. The thumbscrew 34, as shown in FIGS. 7–9, associated with the first jaw 16 is loosened in order to enable the first jaw to pivot relative to the shaft 12. The second jaw 22 is then moved along the shaft 12 toward the first jaw 16 until the gaging surface 23 of the second jaw abuts the third wall 66 of the tray 56, and a tip of the gaging surface 18 of the first jaw contacts the second wall 62 of the tray. The contact between the gaging surface 18 of the first jaw 16 and the second wall 62 of the tray 56 as the second jaw 22 is moved along the shaft 12 causes the first jaw to pivot until the gaging surface of the first jaw abuts the second wall of the tray. The thumbscrew 34 associated with the first jaw 16 is then tightened to maintain the first jaw at an orientation relative to the shaft 12 where the gaging surface 18 of the first jaw abuts the second wall 62 of the tray 56. The distance of the first wall 60 extending between the first corner 58 and the second corner 64 of the tray 56 is then accurately measured using either or both of the scales 24 on the shaft 12 and the digital measuring device 26.

As can be seen in FIG. 10, the first jaw 16 preferably includes index marks 29 for determining the angular orientation of the gaging surface 18 of the first jaw relative to the gaging surface 14 of the shaft 12. However, the angular orientation can be determined in other ways without departing from the scope of the present invention. For example, the angular orientation could be determined by the digital measuring device 26 and shown on the display panel 55.

Referring now to FIGS. 11–17, a slide caliper in accordance with a second embodiment of the present invention is generally indicated by the reference number 110. Like elements with the slide caliper 10 are labelled by like reference numbers preceded by "1". The slide caliper 110 is used for measuring the length between two corners of an object wherein both corners might form theoretical sharp corners.

The slide caliper 110 comprises an elongated shaft 112 defining a first gaging surface 114. A first jaw 116 defining a second gaging surface 118 is pivotally coupled to the shaft 112 preferably adjacent to a first longitudinal end 120 of the shaft. A second jaw 122 defining a third gaging surface 123 is pivotally and slidably coupled to the shaft 112 for movement therealong. The shaft 112 preferably includes a graduated or linear measuring scale 124 therealong for measuring the distance between two corners of an object to be held between the gaging surface 118 of the first jaw 116 and the gaging surface 123 of the second jaw 122 as will be explained more fully below. The shaft 112 also preferably includes a conventional digital measuring device 126 coupled to and slidable with the second jaw 122 along the shaft for more precisely measuring the distance between two corners of the object to be held between the first and second jaws 116, 122.

Figure 12:
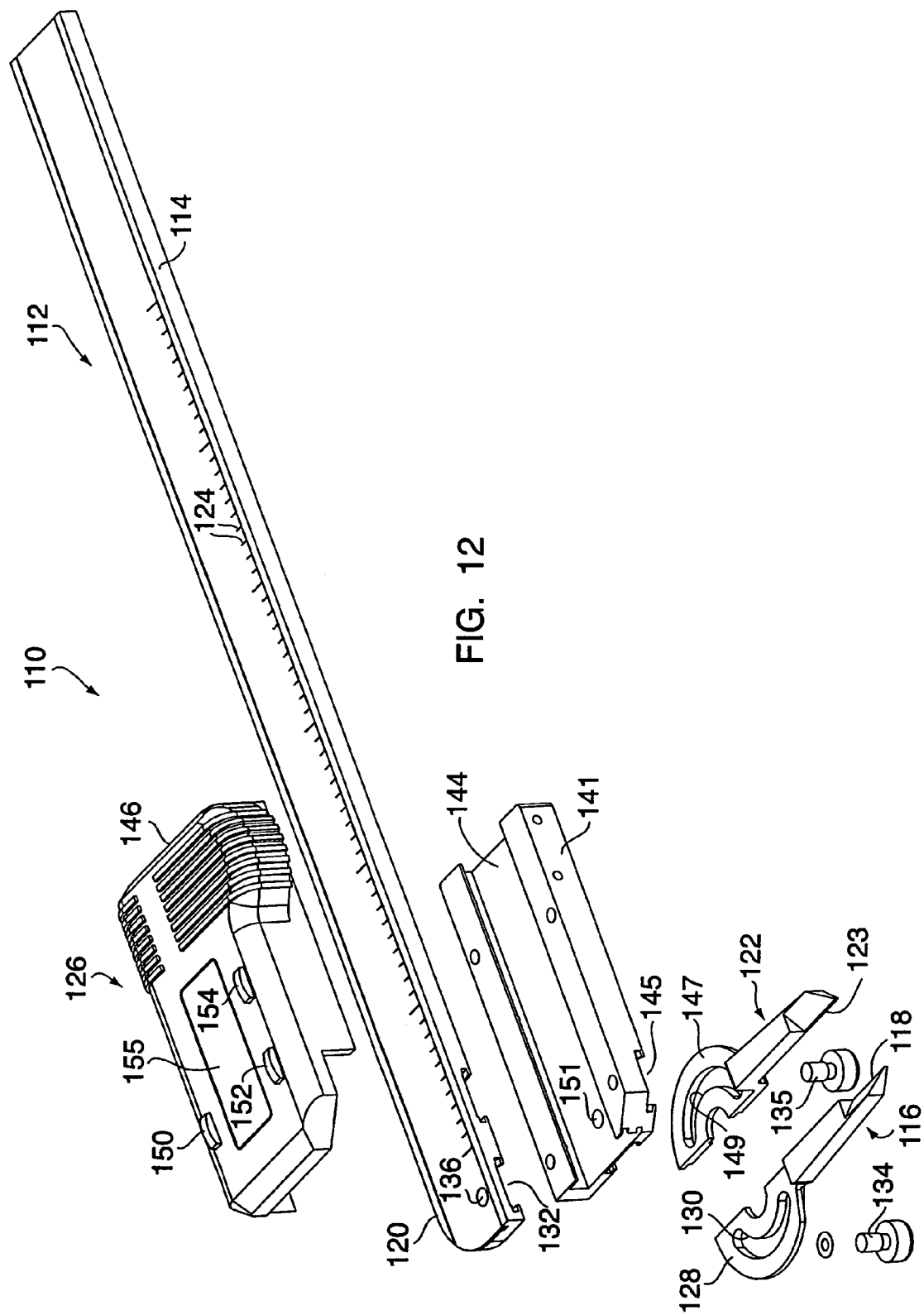
FIG. 12 is an exploded isometric view of the slide caliper of FIG. 11.
Figure 13:
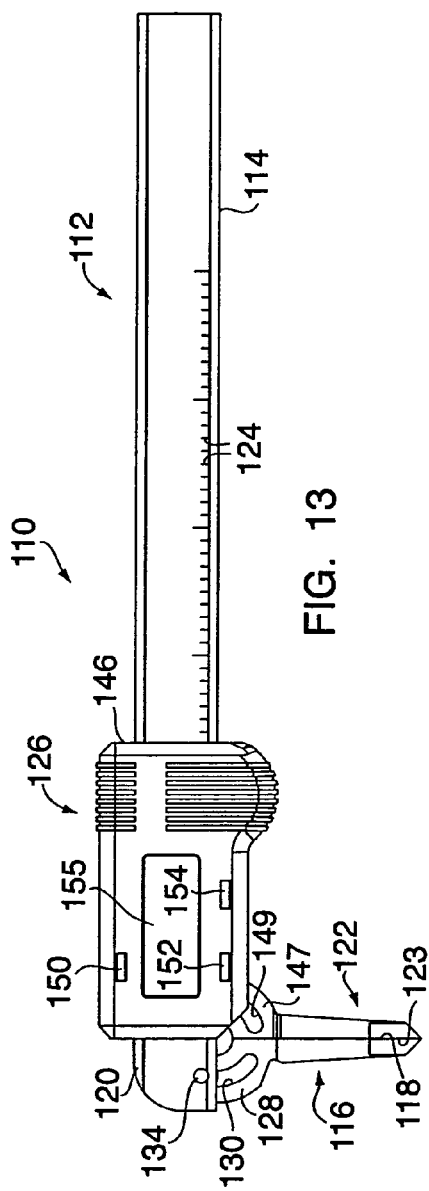
FIG. 13 is a top plan view of the slide caliper of FIG. 11.
Figure 14:
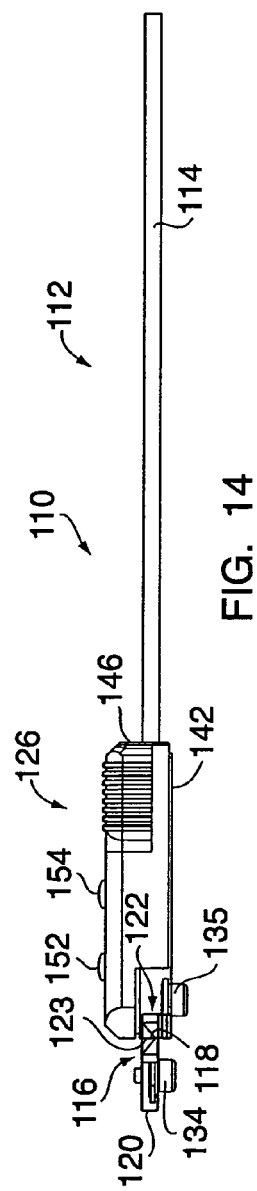
FIG. 14 is a side elevation view of the slide caliper of FIG. 11.
Figure 15:
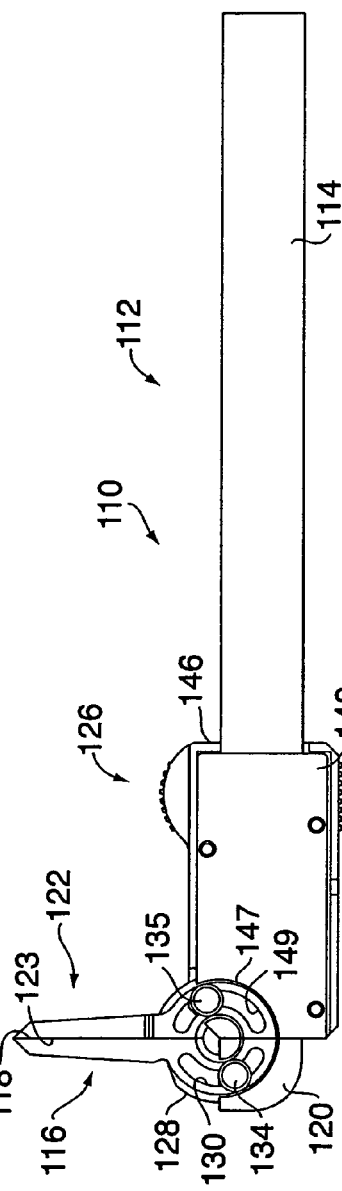
FIG. 15 is a bottom plan view of the slide caliper of FIG. 11.
Figure 16:
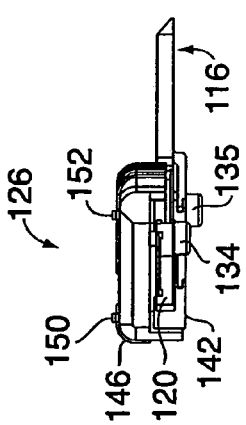
FIG. 16 is an end view of the slide caliper of FIG. 11.

As best shown in FIG. 12, the first jaw 116 includes an arcuate extension 128 defining a semi-circular slot 130 for being pivotally received within a recess 132 defined by an underside of the shaft 112. The arcuate extension 128 of the first jaw 116 when received within the recess 132 is coupled to and tightened against the shaft 112 with, for example, a thumb screw 134 having two components cooperating with each other to extend through an aperture 136 defined by the shaft and the slot 130 defined by the arcuate extension of the first jaw.

The first jaw 116 is generally continuously adjustably pivotable relative to the shaft 112 about a pivot axis 138 (see FIG. 17) coinciding with an intersection of the gaging surface 114 of the shaft 112 and another axis 140 extending along the gaging surface 118 of the first jaw. Preferably, the pivot axis 138 is a zero distance mark of a measuring scale for generally measuring the distance between two corners of an object to be held between the gaging surface 118 of the first jaw 116 and the gaging surface 123 of the second jaw 122. The first jaw 116 is adjustably pivotable to enable the gaging surface 118 of the first jaw to abut and thereby accommodate an opposing wall of an object having a corner forming various angles including a right angle and angles that are less than or greater than 90 degrees.

As best shown in FIG. 12, the slide caliper 110 further comprises a slide member 141 defining a channel 144 along an upper side thereof for slidably receiving an underside of the shaft 112. An underside of the slide member 141 defines a recess 145 for pivotally receiving an arcuate extension 147 of the second jaw 122 to enable movement of the second jaw along the shaft 112. The arcuate extension 147 defines a semi-circular slot 149. The second jaw 122 including the extension 147 is preferably substantially a mirror image, although jogged, of the first jaw 116 including the arcuate extension 128. The second jaw 122 is pivotally coupled to the shaft 112 via the slide member 141. The arcuate extension 147 of the second jaw 122 when received within the recess 145 defined by the slide member 141 is coupled to and tightened against the slide member with, for example, a thumb screw 135 having two components cooperating with each other to extend through an aperture 151 defined by the slide member and the slot 149 defined by the arcuate extension of the second jaw.

Figure 11:
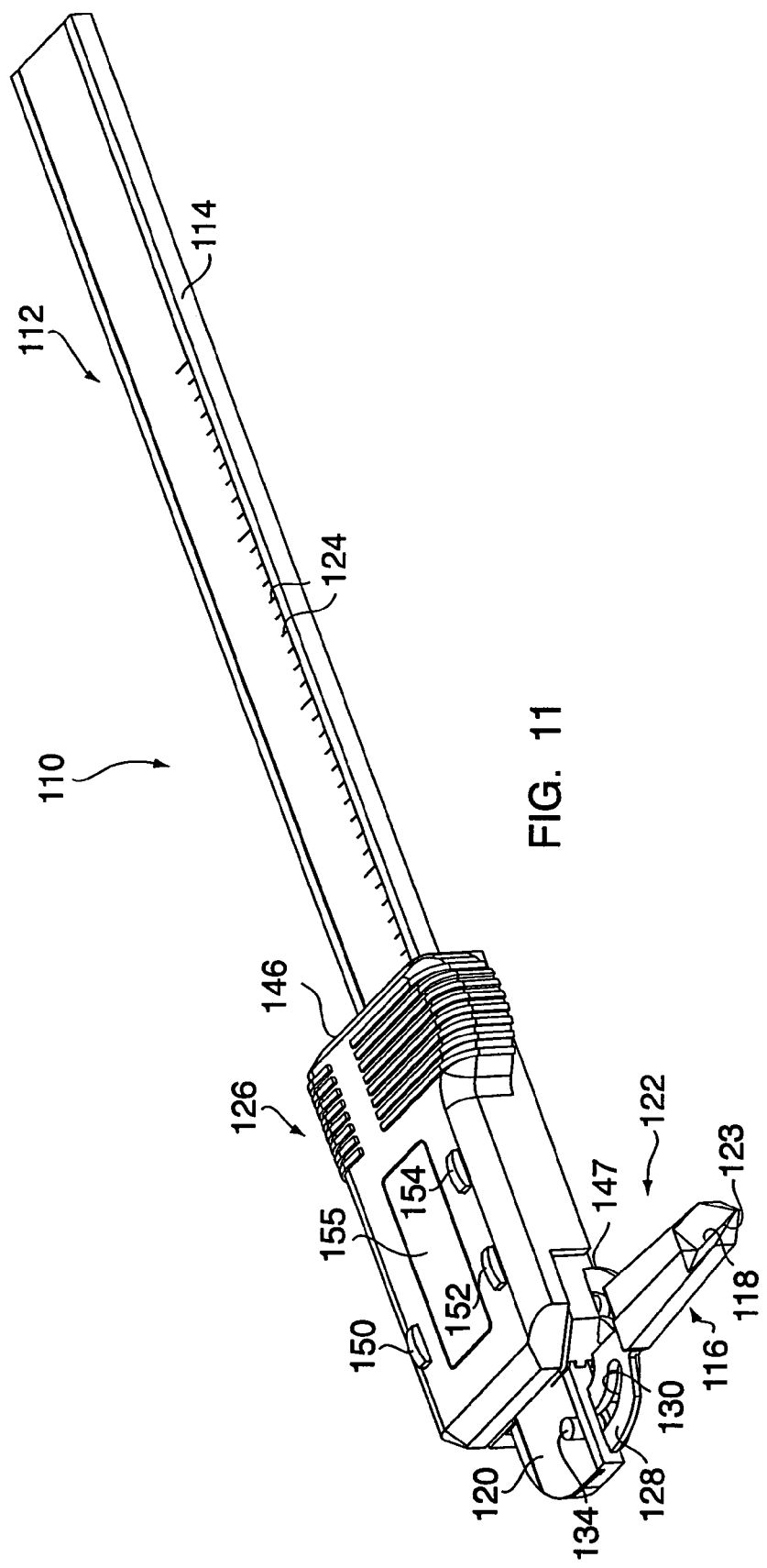
FIG. 11 is an isometric view of a slide caliper in accordance with a second embodiment of the present invention.

The second jaw 122 is generally continuously adjustably pivotable relative to the shaft 112 about a pivot axis 153 (see FIG. 17) that is movable along with the second jaw 122 along the shaft and coinciding with an intersection of the gaging surface 114 of the shaft 112 and another axis 161 extending along the gaging surface 123 of the second jaw. The second jaw 122 is adjustably pivotable to enable the gaging surface 123 of the second jaw to abut and thereby accommodate an opposing wall of an object having a corner forming various angles including a right angle and angles that are less than or greater than 90 degrees. As can be seen in FIG. 11, the ability of the first jaw 116 and the second jaw 122 each to assume a neutral orientation of 90 degrees permits the slide caliper 110 to be employed in a conventional manner.

As best shown in FIG. 12, the digital measuring device 126 includes a housing 146 defining a recess 148 on an underside thereof for being received over the shaft 112 and engaging the extension 147 of the second jaw 122 via the slide member 141 to secure the second jaw to the shaft for movement therealong. The digital measuring device 126 preferably includes a display panel 155, first switch 150 for toggling between measurements in inches and millimeters, a second switch 152 for turning the device on or off, and a third switch 154 for calibrating the digital measuring device 126 when the gaging surface 118 of the first jaw 116 abuts the gaging surface 123 of the second jaw 122 as shown, for example, in FIG. 11. Although the digital measuring device 126 is shown and described by way of example with three switches performing specific functions, it should be understood that the digital measuring device can be embodied in other ways without departing from the scope of the present invention. For example, the second switch 152 for turning the device on or off is not necessary for a solar powered digital measuring device.

In operation, the digital measuring device 126 of the slide caliper 110 is turned on by pressing the second switch 152. The digital measuring device 126 is preferably calibrated/zeroed by moving the second jaw 122 along the shaft 112 until the gaging surface 123 of the second jaw 122 abuts the gaging surface 118 of the first jaw 116. While the gaging surfaces 118, 123 of the first and second jaws 116, 122 are abutting each other, the third switch 154 is pressed to calibrate/zero the digital measuring device 126. The second jaw 122 is then moved along the shaft 112 away from the first jaw 116 in order to accommodate between the jaws an object to be measured such as, for example, a sheet metal wall of a fan tray.

Figure 17:
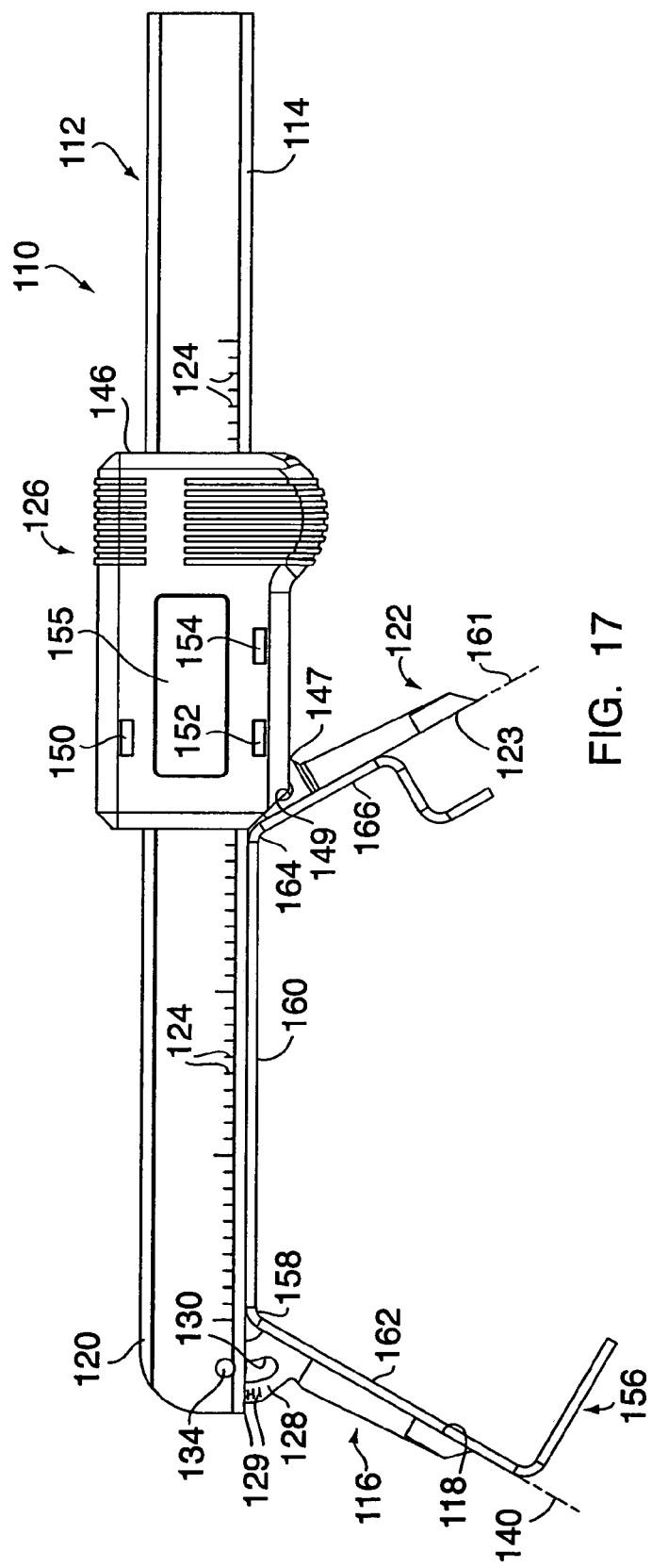
FIG. 17 is a top plan view showing the slide caliper of FIG. 11 measuring a structure having two theoretical sharp corners.
Figure 18:
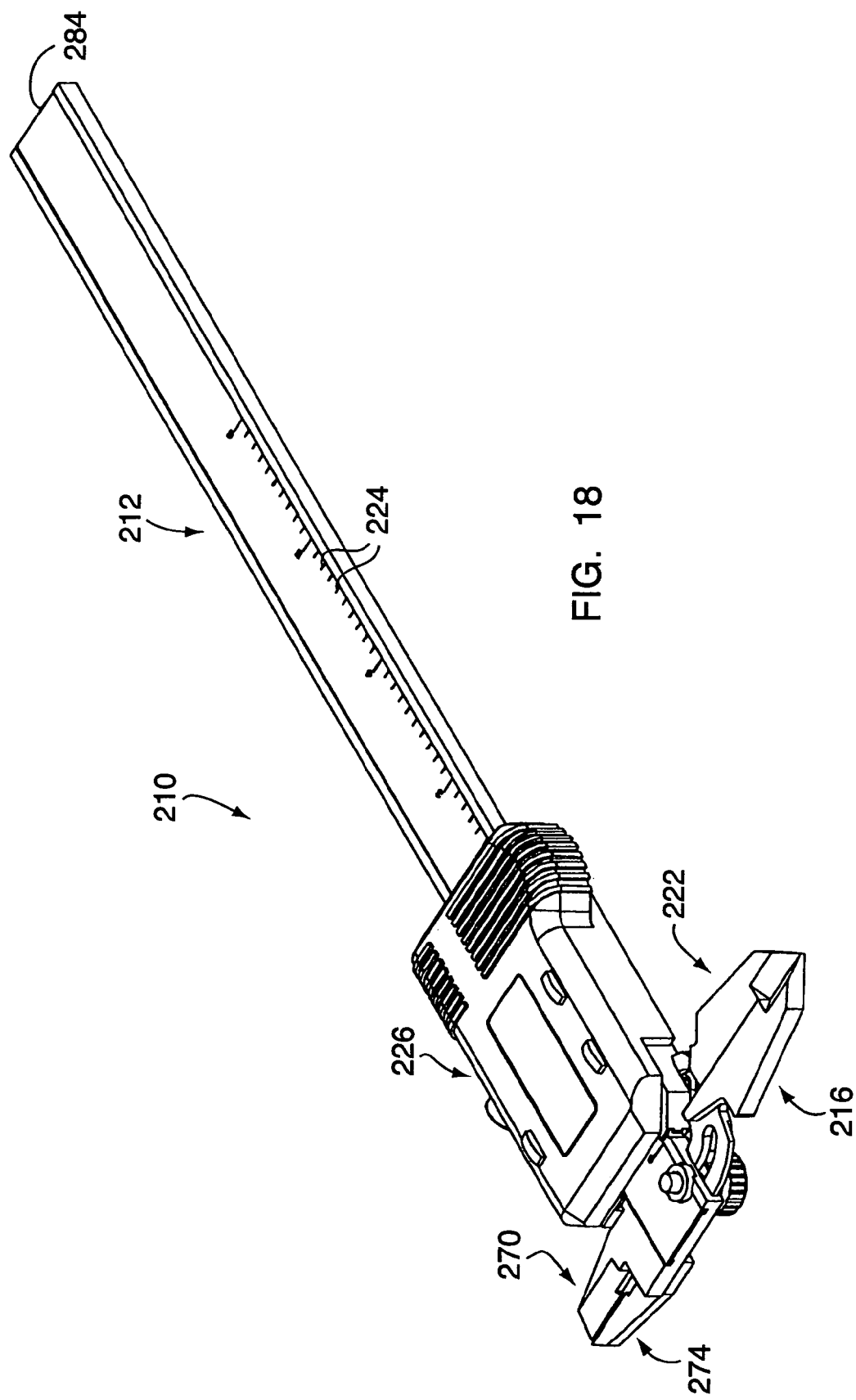
FIG. 18 is an isometric view of a slide caliper in accordance with a third embodiment of the present invention.

As shown by way of example in FIG. 17, a fan tray 156 includes a sheet metal wall having a distance to be measured between two corners of the tray. A first corner 158 of the tray 156 is defined as the convergence of a first wall 160 and a second wall 162 of the tray. A second corner 164 of the tray 156 is defined as the convergence of the first wall 160 and a third wall 166. As can be seen in FIG. 17, the first wall 160 and the second wall 162 converging at the first corner 158 cooperate to form a theoretical sharp corner having an angle that is greater than 90 degrees. The first wall 160 and the third wall 166 converging at the second corner 164 also cooperate to form a theoretical sharp corner having an angle that is greater than 90 degrees.

The first wall 160 of the tray 156 is placed against the gaging surface 114 of the shaft 112. The thumbscrews 134, 135 associated with the first and second jaws 116, 122 are loosened in order to enable the first and second jaws to pivot relative to the shaft 112. The second jaw 122 is then moved along the shaft 112 toward the first jaw 116 until a tip of the gaging surface 123 of the second jaw contacts the third wall 166 of the tray 156, and a tip of the gaging surface 118 of the first jaw contacts the second wall 162 of the tray. The contact between the gaging surface 118 of the first jaw 116 and the second wall 162 of the tray 156 as the second jaw 122 is moved along the shaft 112 causes the first jaw to pivot until the gaging surface of the first jaw abuts the second wall of the tray. Moreover, the contact between the gaging surface 123 of the second jaw 122 and the third wall 166 as the second jaw is moved along the shaft 112 causes the second jaw to pivot until the gaging surface of the second jaw abuts the third wall. The thumbscrews 134, 135 associated with the first and second jaws 116, 122 are then tightened to maintain the first and second jaws at an orientation relative to the shaft 112 where the gaging surfaces 118, 123 of the first and second jaws respectively abut the second and third walls 162, 166 of the tray. The distance of the first wall 160 extending between the first corner 158 and the second corner 164 of the tray 156 is then accurately measured using either or both of the scales 124 on the shaft 112 and the digital measuring device 126. More precisely, the slide caliper 110 measures the distance along the shaft 112 between the intersection of the gaging surface 114 of the shaft 112 and the axis 140 extending along the gaging surface 118 of the first jaw 116, and the intersection of the gaging surface 114 of the shaft 112 and the axis 161 extending along the gaging surface 123 of the second jaw 122.

As can be seen in FIG. 17, the first and second jaws 116, 122 preferably include index marks 129 for determining the angular orientation of the gaging surfaces 118, 123 of the jaws relative to the gaging surface 114 of the shaft 112. However, the angular orientation can be determined in other ways without departing from the scope of the present invention. For example, the angular orientation could be determined by the digital measuring device 126 and shown on the display panel 155.

Preferably, one of the shaft 112 and the first jaw 116 defines a detent (not shown) for locking the first jaw into a neutral orientation. Alternatively, other means such as a squareness set block on the gaging surface 114 could be substituted to set square the first jaw 116. Likewise, the second jaw 122 preferably defines a detent (not shown) for locking the second jaw into a neutral orientation in order to permit the slide caliper 110 to be employed in a conventional manner. Alternatively, other means such as a squareness set block on the gaging surface 114 could be substituted to set square the second jaw 122.

Referring now to FIGS. 18–24, a slide caliper in accordance with a third embodiment of the present invention is generally indicated by the reference number 210. Like elements with the slide calipers 10 and 110 are labelled by like reference numbers preceded by "2". The slide caliper 210 is generally the same as the slide caliper 110 shown in FIGS. 11–17 except that the slide caliper 210 further comprises a pair of additional jaws for measuring inner diameters, and further comprises means for making depth measurements. Accordingly, the slide caliper 210 will be explained only with respect to these additional features.

Figure 19:
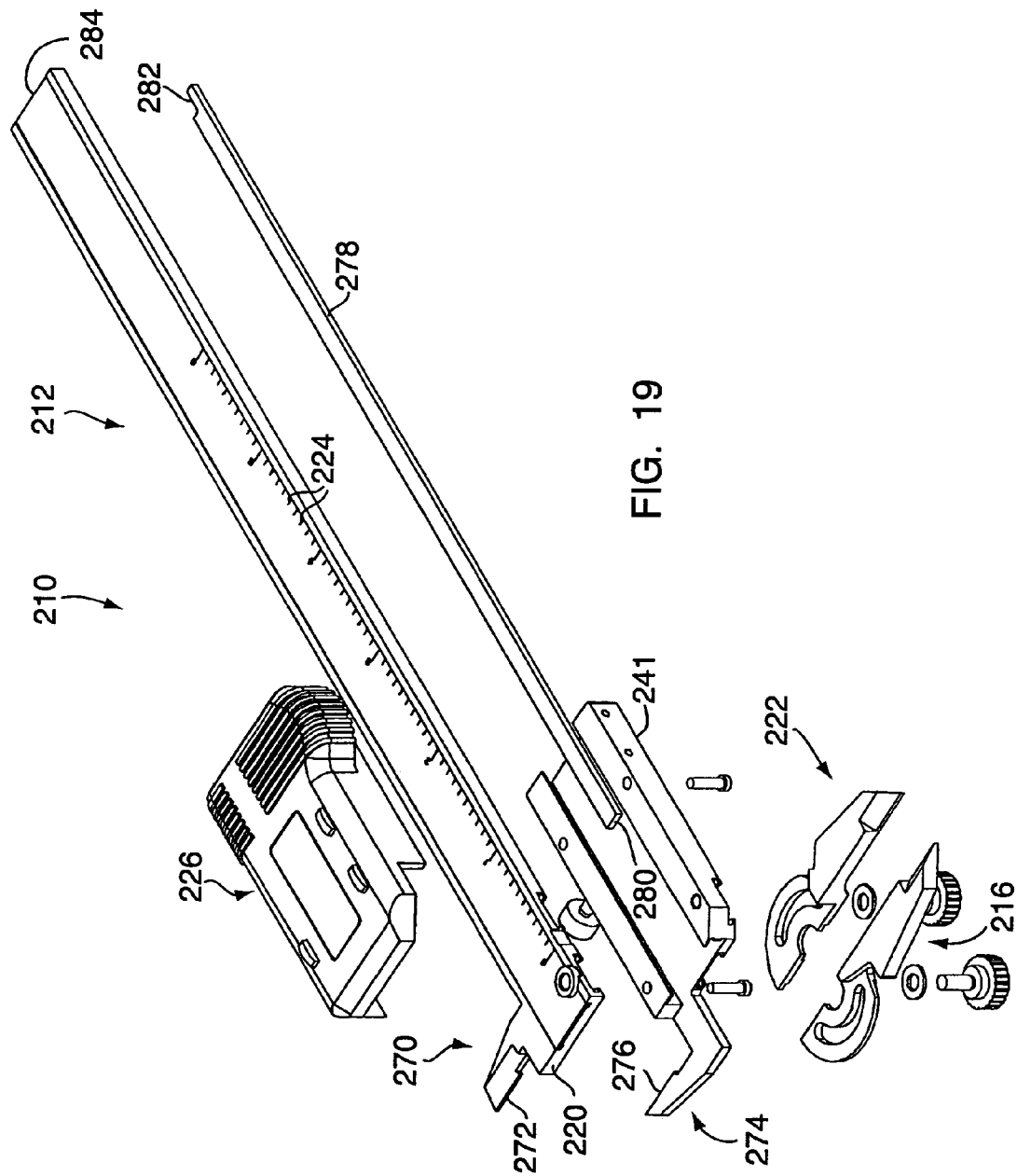
FIG. 19 is an exploded isometric view of the slide caliper of FIG. 18.
Figure 24:
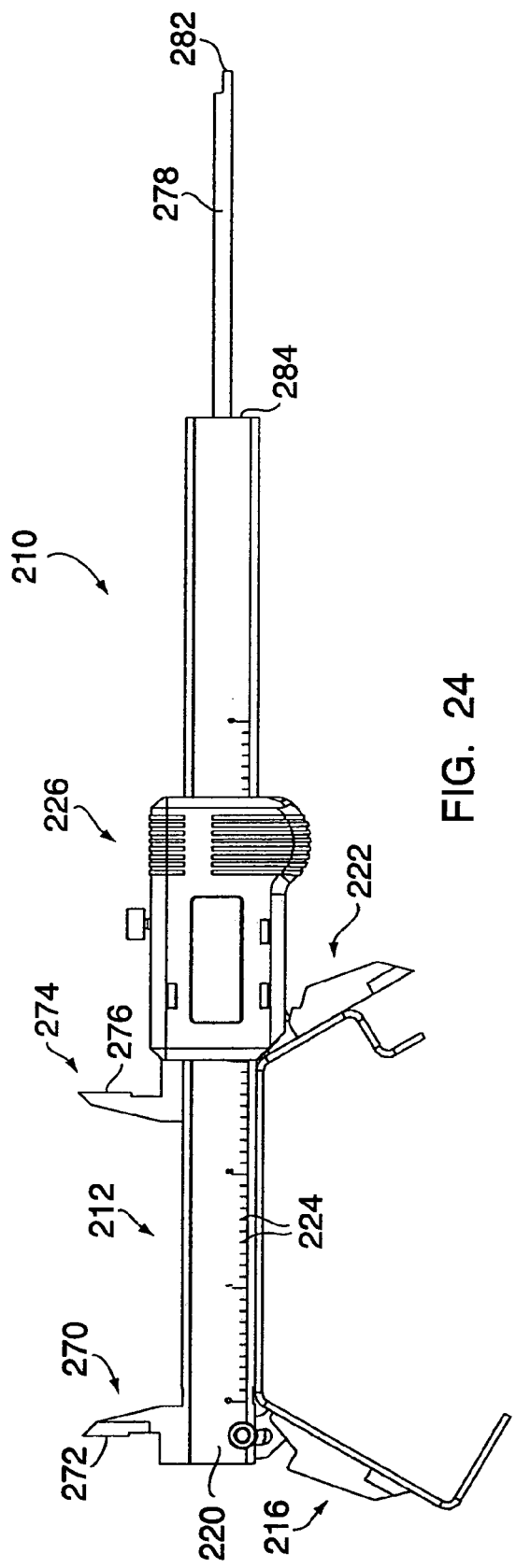
FIG. 24 is a top plan view showing the slide caliper of FIG. 18 measuring a structure having two theoretical sharp corners.

The slide caliper 210 comprises a third jaw 270 defining a fourth gaging surface 272 coupled to the shaft 212 preferably adjacent to the first longitudinal end 220 of the shaft. The third jaw 270 extends outwardly from the shaft 212 in a direction generally opposite to that of the first and second jaws 216, 222. The slide caliper further comprises a fourth jaw 274 defining a fifth gaging surface 276 slidably coupled to the shaft 212 for movement therealong. The fourth jaw 274 also extends outwardly from the shaft 212 in a direction generally opposite to that of the first and second jaws 216, 222. As best shown in FIG. 19, the fourth jaw 274 is preferably coupled to the shaft 212 via the slide member 241. The gaging surface 272 of the third jaw 270 and the gaging surface 276 of the fourth jaw 274 face away from one another when the fourth jaw is moved along the shaft 212 away from the third jaw, thereby permitting the third and fourth jaws to measure inner diameters or otherwise measure distances therebetween. The fourth jaw 274 is disposed slightly below the third jaw 270 relative to the shaft 212 so as to enable the fourth jaw to move under the third jaw and align the gaging surface 276 of the fourth jaw in overlying relationship with the gaging surface 272 of the third jaw (see FIG. 20) when the third and fourth jaws are at the zero distance position relative to each other. Alternatively, the fourth jaw could be modified to be disposed slightly above the third jaw to enable the fourth jaw to move over the third jaw without departing from the scope of the present invention.

In operation, the fourth jaw 274 is moved along the shaft 212 away from the third jaw 270 until the gaging surface 272 of the third jaw and the gaging surface 276 of the fourth jaw abut surfaces having an inner diameter or otherwise defining a distance therebetween to be measured. The distance between the gaging surface 272 of the third jaw 270 and the gaging surface 276 of the fourth jaw 274 can be determined from the measuring scale 224 on the shaft 212, or can be determined from the distance shown on the display panel 255 of the digital measuring device 226.

The slide caliper 210 further comprises means for making depth measurements. As shown in FIG. 19, for example, an elongated member 278 for making depth measurements is coupled at a first longitudinal end 280 to the slide member 241, and is disposed generally within a recess defined by an underside of the shaft 212 (see FIG. 24). When the slide caliper 210 is in the zero distance position, a second longitudinal end 282 of the elongated member 278 is either flush with or extends slightly outwardly from a second longitudinal end 284 of the shaft 212.

In operation, the second longitudinal end 282 of the elongated member 278 is moved away from the second longitudinal end 284 of the shaft 212 a distance corresponding to the depth to be measured. The distance between the second longitudinal end 282 of the elongated member 278 and the second longitudinal end 284 of the shaft 212 can be determined from the measuring scale 224 on the shaft and corresponds generally to the distance between the first and second jaws 216, 222, or can be determined from the distance shown on the display panel 255 of the digital measuring device 226.

Although the slide caliper 210 for measuring inner diameters is shown and described with respect to a slide caliper that can measure two theoretical sharp corners, it should be understood that a slide caliper for measuring inner diameters in accordance with the present invention can be used in a slide caliper that can measure one theoretical sharp corner—similar to the slide caliper 10 shown in FIGS. 1–10—without departing from the scope of the present invention. Moreover, although the third and fourth jaws 270, 274 are non-pivoting, it should be understood that one or more of the third and fourth jaws could be substituted with pivotable jaws.

As will be recognized by those of ordinary skill in the pertinent art, numerous modifications and substitutions may be made to the above-described embodiments of the present invention without departing from the scope of the invention. Accordingly, the preceding portion of this specification is to be taken in an illustrative, as opposed to a limiting sense.

What is claimed is:

1. A slide caliper comprising:
   an elongated shaft defining a gaging surface for abutting against a first surface of an object having a length to be measured;
   a first jaw coupled to the shaft and defining a gaging surface for abutting against a second surface of the object; and
   a second jaw slidably coupled to the shaft and defining a gaging surface for abutting against a third surface or edge of the object, the second jaw being adjustable in position along the shaft between a first position where the gaging surfaces of the jaws generally abut each other to a predetermined second position where the gaging surfaces of the jaws are generally maximally spaced from each other, and wherein at least one of the jaws is adjustably pivotable relative to the shaft about a pivot axis coinciding with an intersection of the gaging surface of the shaft and another axis extending along the associated gaging surface of said one of the jaws.

2. A slide caliper as defined in claim 1, wherein the at least one of the jaws includes index marks for determining an angular orientation of the gaging surface of the at least one of the jaws relative to the gaging surface of the shaft.

3. A slide caliper as defined in claim 1, wherein the first jaw is adjustably pivotable.

4. A slide caliper as defined in claim 3, wherein the pivot axis of the first jaw coincides with a zero distance mark of a measuring scale.

5. A slide caliper as defined in claim 1, wherein the second jaw is adjustably pivotable.

6. A slide caliper as defined in claim 1, wherein the first jaw and the second jaw are adjustably pivotable.

7. A slide caliper as defined in claim 1, wherein the first jaw is adjustably pivotable relative to the shaft, and wherein the second jaw is non-pivotally coupled to the shaft, the second jaw being disposed in a neutral orientation such that the gaging surface of the second jaw is perpendicular to the gaging surface of the shaft.

8. A slide caliper as defined in claim 1, wherein the elongated shaft includes a graduated measuring scale therealong for measuring the distance between an intersection of the gaging surface of the shaft and an as extending along the gaging surface of the first jaw, and the intersection of the gaging surface of the shaft and an axis extending along the gaging surface of the second jaw.

9. A slide caliper as defined in claim 1, further comprising a digital measuring device coupled to and slidable with the second jaw along the shaft for measuring the distance between an intersection of the gaging surface of the shaft and an axis extending along the gaging surface of the first jaw, and the intersection of the gaging surface of the shaft and an axis extending along the gaging surface of the second jaw.

10. A slide caliper as defined in claim 9, wherein the digital measuring device is for determining an angular orientation of the gaging surface of the at least one of the jaws relative to the gaging surface of the shaft.

11. A slide caliper as defined in claim 1, wherein the first and second jaws accommodate a neutral orientation such that the gaging surfaces of the jaws are each perpendicular to the gaging surface of the shaft.

12. A slide caliper as defined in claim 11, wherein the at least one of the jaws is adjustably pivotable in at least one direction away from the neutral orientation.

13. A slide caliper as defined in claim 11, wherein the at least one of the jaws is adjustably pivotable in either direction away from the neutral orientation.

14. A slide caliper as defined in claim 1, further comprising:
   a third jaw coupled to the shaft defining a gaging surface; and
   a fourth jaw slidably coupled to the shaft and defiling a gaging surface, the fourth jaw being adjustable in position along the shaft between a first position, where the gaging surfaces of the third and fourth jaws generally align with each other relative to the shaft, to a predetermined second position where the gaging surfaces of the third and fourth jaws are facing away from each other and are generally maximally spaced from each other in order to measure inner diameters or other distances between the gaging surfaces of the third and fourth jaws.

15. A slide caliper as defined in claim 14, wherein the third and fourth jaws extend from the shaft in a direction generally opposite to that of the first and second jaws.

16. A slide caliper as defined in claim 1, further comprising means coupled to the shaft for making depth measurements.

17. A slide caliper as defined in claim 16, further wherein the means for making depth measurements includes an elongated member slidably coupled to the shaft, the elongated member having a longitudinal end adjustably extending beyond a longitudinal end of the shaft for measuring a depth corresponding to a distance between the longitudinal ends of the elongated member and the shaft.

18. A slide caliper comprising:
   an elongated shaft defining a gaging surface for abutting against a first surface of an object having a length to be measured;
   a first jaw coupled to the shaft and defining a gaging surface for abutting against a second surface of the object, the first jaw being adjustably pivotable relative to the shaft about a pivot axis coinciding with an intersection of the gaging surface of the shaft and another axis extending along the gaging surface of the first jaw; and
   a second jaw slidably coupled to the shaft and defining a gaging surface for abutting against a third surface of the object the second jaw being adjustable in position along the shaft between a first position where the gang surfaces of the jaws generally abut each other to a predetermined second position where the gaging surfaces of the jaws are generally maximally spaced from each other, the gaging surface of the second jaw being generally perpendicular to the gaging surface of the shaft.

19. A slide caliper as defined in claim 18, wherein the first jaw includes index marks for determining an angular orientation of the gaging surface of the first jaw relative to the gaging surface of the shaft.

20. A slide caliper as defined in claim 18, wherein the first jaw includes an extension defining a semicircular slot, the shaft defines an aperture, and further comprising a connector extending trough the slot and the aperture for pivotally coupling the first jaw to the shaft.

21. A slide caliper as defined in claim 20, wherein an underside of the shaft defines a recess for accommodating the extension of the first jaw.

22. A slide caliper as defined in claim 20, wherein the connector is a thumbscrew, the thumbscrew for being loosened to pivotally adjust an orientation of the first jaw relative to the shaft, and the thumbscrew for being tightened to maintain an orientation of the first jaw relative to the shaft.

23. A slide caliper as defined in claim 18, wherein the second jaw includes an extension defining a channel for slidably receiving an underside of the shaft to enable movement of the second jaw along the shaft.

24. A slide caliper comprising:
   an elongated shaft defining a gaging surface for abutting against a first surface of an object having a length to be measured;
   a first jaw coupled to the shaft and defining a gaging surface for abutting against a second surface of the object, the first jaw being adjustably pivotable relative to the shaft about a pivot axis coinciding with an intersection of the gaging surface of the shaft and another axis extending along the gaging surface of the first jaw; and
   a second jaw slidably coupled to the shaft and defining a gaging surface for abutting against a third surface of the object, the second jaw being adjustable in position along the shaft between a first position where the gaging surfaces of the jaws generally abut each other to a predetermined second position where the gaging surfaces of the jaws are generally maximally spaced from each other, the second jaw being adjustably pivotable relative to the shaft about a pivot axis coinciding with an intersection of the gaging surface of the shaft and another axis extending along the gaging surface of the second jaw.

25. A slide caliper as defined in claim 24, wherein the first and second jaws each include index marks for determining an angular orientation of the gaging surfaces of the first and second jaws relative to the gaging surface of the shaft.

26. A slide caliper as defined in claim 24, wherein the first jaw includes an extension defining a semicircular slot, the shaft defines an aperture, and further comprising a connector extending through the slot and the aperture for pivotally coupling the first jaw to the shaft.

27. A slide caliper as defined in claim 26, wherein an underside of the shaft define a recess for accommodating the extension of the first jaw.

28. A slide caliper as defined in claim 26, wherein the connector is a thumbscrew, the thumbscrew for being loosened to pivotally adjust an orientation of the first jaw relative to the shaft, and the thumbscrew for being tightened to maintain an orientation of the first jaw relative to the shaft.

29. A slide caliper as defined in claim 24, wherein the second jaw includes an extension defining a semicircular slot, and further including a slide member defining an aperture and defining a channel for slidably receiving an underside of the shaft, and further including a connector extending through the slot and the aperture to pivotally couple the second jaw to the shaft via the slide member and to enable movement of the second jaw along the shaft.

30. A slide caliper as defined in claim 29, wherein an underside of the slide member defines a recess for accommodating the extension of the second jaw.

31. A slide caliper as defined in claim 29, wherein the connector is a thumbscrew, the thumbscrew for being loosened to pivotally adjust an orientation of the second jaw relative to the shaft, and the thumbscrew for being tightened to maintain an orientation of the second jaw relative to the shaft.

32. A slide caliper as defined in claim 24, further comprising:
   a third jaw coupled to the shaft defining a gaging surface; and
   a fourth jaw slidably coupled to the shaft and defining a gaging surface, the fourth jaw being adjustable in position along the shaft between a first position, where the gaging surfaces of the third and fourth jaws generally align with each other relative to the shaft, to a predetermined second position where the gaging surfaces of the third and fourth jaws are facing away from each other and are generally maximally spaced from each other in order to measure inner diameters or other distances between the gaging surfaces of the third and fourth jaws.

33. A slide caliper as defined in claim 32, wherein the third and fourth jaws extend from the shaft in a direction generally opposite to that of the first and second jaws.

34. A slide caliper as defined in claim 24, further comprising means coupled to the shaft for making depth measurements.

35. A slide caliper as defined in claim 34, further wherein the means for making depth measurements includes an elongated member slidably coupled to the shaft, the elongated member having a longitudinal end adjustably extending beyond a longitudinal end of the shaft for measuring a depth corresponding to a distance between the longitudinal ends of the elongated member and the shaft.

* * * * *

UNITED STATES PATENT AND TRADEMARK OFFICE
CERTIFICATE OF CORRECTION

PATENT NO. : 6,990,746 B2
DATED : January 31, 2006
INVENTOR(S) : Christopher Paul Penna and Dale Allan Watson It is certified that error appears in the above-identified patent and that said Letters Patent is hereby corrected as shown below:

<u>Column 11,</u>
Line 43, "gang" should read -- gaging --.

Signed and Sealed this

Twenty-fifth Day of April, 2006

JON W. DUDAS
*Director of the United States Patent and Trademark Office*